Figure 1:
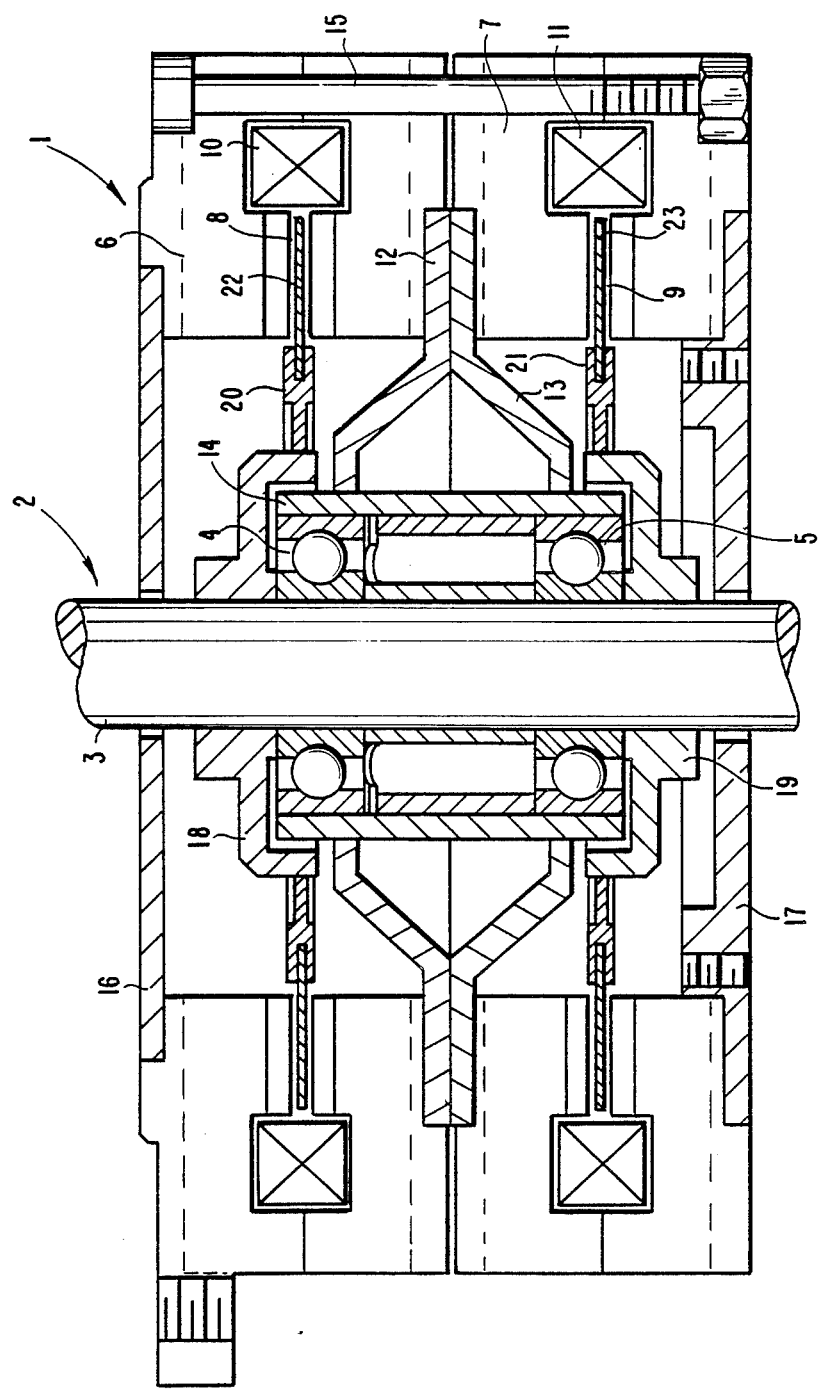

United States Patent [19]

Oudet

[11] Patent Number: 4,891,538

[45] Date of Patent: Jan. 2, 1990

[54] SYNCHRONOUS MOTOR WITH SINUSODIAL TORQUE VARIATION IN EACH PHASE

[75] Inventor: Claude Oudet, Besancon, France

[73] Assignee: Portescap, Switzerland

[21] Appl. No.: 211,386

[22] Filed: Jun. 24, 1988

[30] Foreign Application Priority Data

Jun. 26, 1987 [CH] Switzerland ............... 2417/87

[51] Int. Cl.$^4$ .................. H02K 19/02; H02K 16/00
[52] U.S. Cl. ........................... 310/162; 310/193; 310/254; 310/268
[58] Field of Search ............ 310/91, 114, 162, 193, 310/216, 268, 254

[56] References Cited

U.S. PATENT DOCUMENTS

| | | | |
|---|---|---|---|
| 3,700,944 | 10/1972 | Heintz | 310/168 |
| 4,330,727 | 5/1982 | Oudet | 310/268 |
| 4,518,883 | 5/1985 | Oudet | 310/49 R |
| 4,658,166 | 4/1987 | Oudet | 310/156 |
| 4,714,854 | 12/1987 | Oudet | 310/268 |
| 4,748,359 | 5/1988 | Yahaka et al. | 310/156 |

Primary Examiner—Patrick R. Salce
Assistant Examiner—D. L. Rebsch
Attorney, Agent, or Firm—Woodard, Emhardt, Naughton Moriarty & McNettt

[57] ABSTRACT

In synchronous electric motors of the type having a movable multipolar permanent magnet member and a stator comprising magnetic circuits coupled to a control coil. The magnetic circuits form an air-gap of variable height in which the permanent magnet member is movably arranged.

The improvement defines the height of the air-gap as a function of the position of the movable member, taking into account various design parameters of the motor, in order to obtain a purely sinusoidal variation of the torque produced in each phase of the motor by a constant control current.

4 Claims, 4 Drawing Sheets

SYNCHRONOUS MOTOR WITH SINUSODIAL TORQUE VARIATION IN EACH PHASE

The present invention relates to electric synchronous motors of the type comprising a movable permanent magnet member and a stator, said stator comprising a magnetic circuit or an assembly of magnetic circuits coupled with at least one electric control coil. More particularly, the invention relates to such a motor wherein said movable member comprises a multipolar permanent magnet having two planar surfaces arranged parallelly to the direction of movement of said movable member and spaced from each other by a distance substantially smaller than the dimensions of said permanent magnet in said planar surfaces. Furthermore, the invention relates to such motors wherein said permanent magnet has a practically linear de-magnetization characteristic in its working range and is magnetized perpendicularly to said planar surfaces so as to exhibit on each of these surfaces, in the direction of movement of the movable member, at least one series of magnetic poles of same polarity, the centers of which are spaced by P along their path of movement, and wherein said magnetic circuit or circuits comprise polar parts facing each other and forming an air-gap in which said multipolar permanent magnet is arranged, said air-gap being symmetrical with respect to the middle plane of the two planar surfaces of the permanent magnet and having a variable height along the path of movement of a point of said middle plane, said variable height having a value of 2 Y and being measured perpendicularly to said middle plane, said variable height having a series of minima E.

The invention further relates to a motor of similar type, but having an asymmetrical air-gap in which a movable member is arranged, which movable member comprises a yoke part of a magnetically permeable material fixed in contact with one of said planar surfaces of said permanent magnet. In this case, the air-gap is formed between a polar part and said yoke part, the variable height of the air-gap being Y and the minima of Y having a value of E/2.

In motors of the above mentioned type, which are described, for example, in the international patent application PCT No. WO 85/02503, it was, up to now, not possible to obtain a torque due to the electric control current, which was, to a satisfactory approximation, a sinusoidal function of the position of the movable member. It is, however, known by theory that such a variation is necessary to obtain a total torque of perfectly constant value in a two-phase motor.

The attempts made in the past to reduce the harmonics contained in the torque due to the current, were based on an empiric search of appropriate shapes for the polar parts or on measures aiming at compensating said harmonics. These attempts, however, did not reach the above mentioned objective in a satisfactory way.

It is a main object of the invention to provide an improved motor of the type mentioned at the beginning in which the torque produced in each phase of the motor by a constant current presents a practically purely sinusoidal variation. A further object of the invention is to provide such a motor which can be manufactured in large quantities at a relatively low price, in spite of the very good performance obtained thanks to said sinusoidal variation.

In accordance with the invention, the improvement of the motors of the above mentioned types consists in giving the polar part or polar parts a shape by which the height of the air-gap has the theoretical value Y defined by the equation $$LN\left[\frac{ch(2\pi Y/P + c) - \cos(2\pi X/P)}{ch(2\pi Y/P - c) - \cos(2\pi X/P)}\right] -$$

$$2 LN\left[\frac{sh(c/2 + \pi E/2P)}{sh(c/2 - \pi E/2P)}\right] = 0$$

in which c is a shape parameter, and by the fact that the maximum error of Y with respect to said theoretical value is $+/-0.05$ P at least within the range $E/2 \leq Y \leq (E/2 + 0.4 P)$.

The polar parts of such a motor can be made by pressing or by machining of an assembly of planar sheet parts arranged perpendicularly to the path of movement or they can be formed by a stack-assembly of sheet parts cut so as to obtain by a step-like approximation the theoretical shape of the pole part profile.

Figure 2:
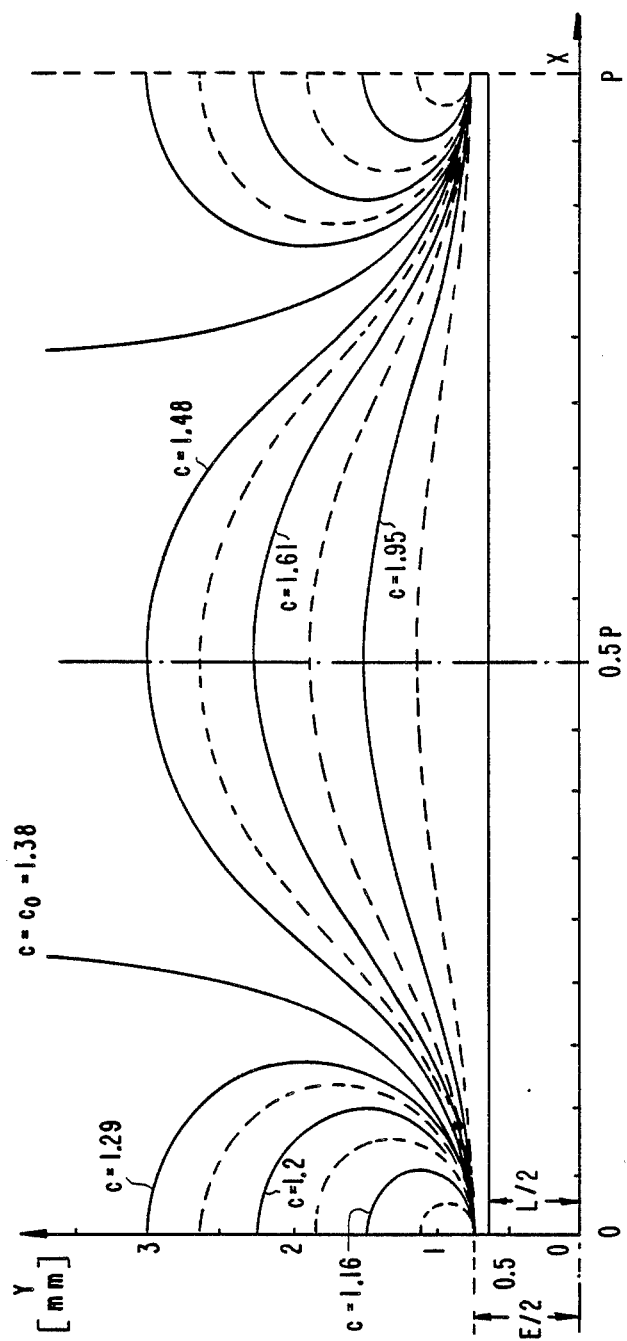
Figure 3:
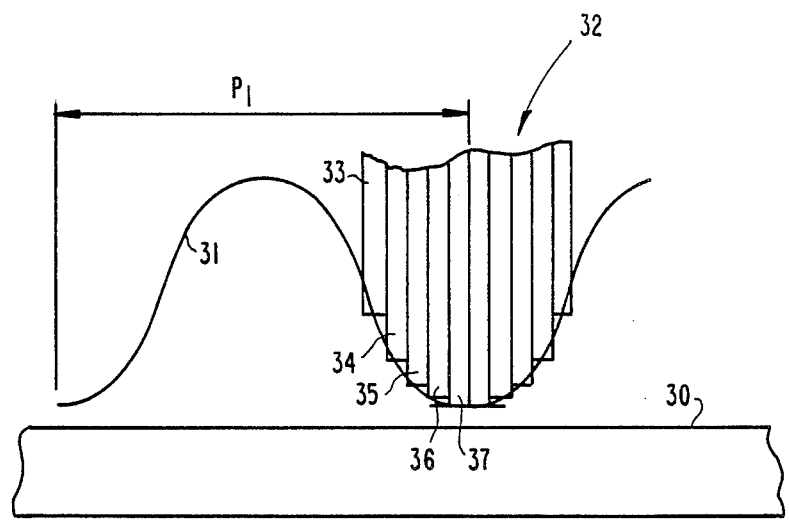
Figure 4:
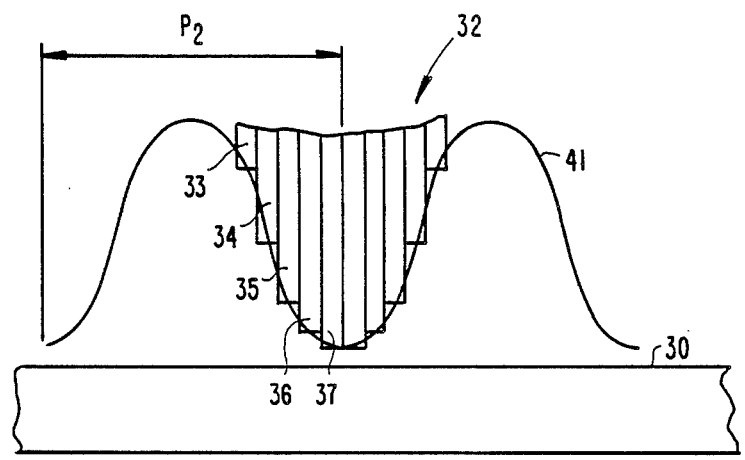
Figure 5:
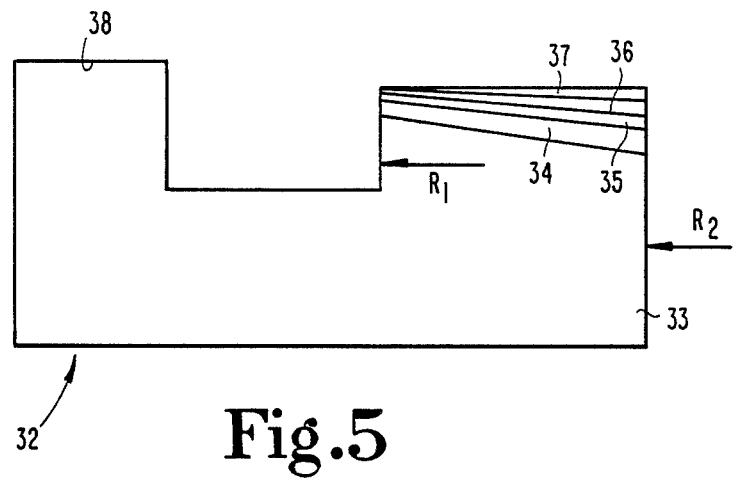
Figure 6:
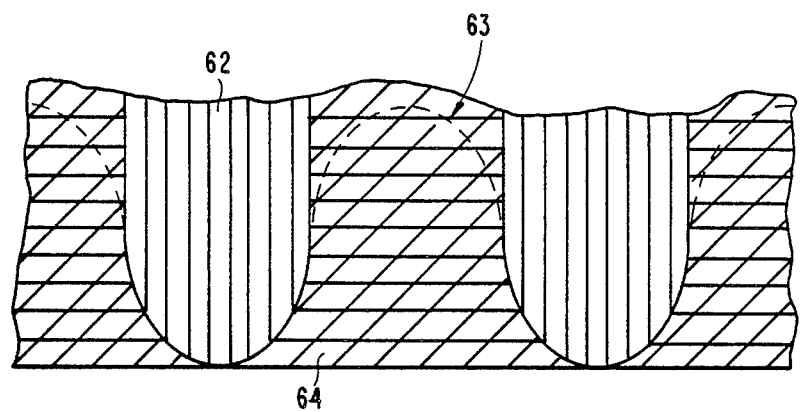

The invention will be better understood in the light of the following description of embodiments mentioned by way of example and illustrated in the attached drawing, in which FIG. 1 is an axial section of a two-phase, two-stage rotary motor according to the invention, FIG. 2 is a diagram showing the various theoretical profile shapes of the polar parts of the motor according to the invention, FIG. 3 is a schematic view of a polar part constituted by a stack of cut sheet parts seen at the level of the outer edge of the annular permanent magnet in the motor according to FIG. 1, FIG. 4 is a view similar to that of FIG. 3, at the level of the inner edge of said permanent magnet, FIG. 5 is a side view of the stack-assembly of sheet parts of FIGS. 3 and 4, and FIG. 6 is a partial view of a polar part made by machining an assembly of sheet parts embedded in a supporting material.

The motor shown in FIG. 1 comprises a stator assembly 1 and a rotary member 2 mounted on a shaft 3 which is supported in the assembly 1 by means of two bearings 4, 5, such as ball bearings.

In the shown embodiment, the stator assembly 1 comprises two magnetic circuits 6,7, having a C-shaped axial section so as to form in the plane of this section two air-gaps 8,9. As described in more detail hereafter, these magnetic circuits can be constituted by stacks of silicon iron sheet parts inserted into slots of a support member of good magnetic permeability. According to another embodiment, each circuit 6,7 can be constituted by an assembly of elementary circuits wherein the sheet-stacks are, for example, embedded in a support member of non-magnetic material.

The magnetic circuits 6,7 are coupled with respective electric control coils 10,11, so as to generate magnetic fields in the air-gaps 8,9 as a function of the energizing currents. Each coil corresponds to one phase of the two-phase motor shown in FIG. 1.

The two magnetic circuits are assembled around a central supporting structure 12,13,14 for the bearings 4,5, by means of screws such as 15, the assembly 1 further comprising closing and mounting members such as 16,17.

The shaft 3 of the rotary member 2 is made fast with two magnet supporting members 18,19 on which respective permanent magnets 22,23 are mounted by means of respective annular intermediary parts 20,21. The permanent magnets 22,23 have the shape of thin annular disks and are made of a material such as samarium-cobalt, having a practically linear de-magnetization characteristic in the working range of the magnet.

Each disk 22,23 is magnetized in a direction parallel to its axis of rotation so as to exhibit on each of its planar surfaces at least one series of poles of same polarity and, preferably, two series of poles of alternating polarities. The centers of two poles of same polarity are spaced by P along the path of their movement. The magnetized zones of the disks 22,23 are arranged inside the respective air-gaps 8,9 so as to allow operation of the motor as a two-phase motor in a manner well known by those skilled in the art.

According to the present improvement of such motors, the air-gap, such as the air-gap 8, has a shape which is close to the ideal shape shown in FIG. 2. This ideal shape is defined by the relationship $$LN\left[\frac{ch(2\pi Y/P + c) - \cos(2\pi X/P)}{ch(2\pi Y/P - c) - \cos(2\pi X/P)}\right] -$$

$$2 LN\left[\frac{sh(c/2 + \pi E/2P)}{sh(c/2 - \pi E/2P)}\right] = 0$$

in which X and Y are the coordinates of the profile of the polar parts. This profile can be developed in the case of a rotary motor, as in the present example. P corresponds to the magnetic pole pitch on the movable member, E is the minimum value of the air-gap and c is a shape parameter. In the example of a rotary motor, it will be noted that P is a linear function of the radius of the permanent magnet.

FIG. 2 shows that from a value of $c=c_0$, the polar parts which are symmetric with respect to $X=0$ and $X=P$, become discontinuous. The value of the parameter $$c=c_0=\text{arc ch exp}(E/P)$$

corresponds to Y values up to infinite. When the parameter c is chosen larger than $c_0$, the polar parts are of a continous type according to the represented ideal profile.

The various possible shapes of the profile of the polar parts, defined by the above mentioned relationship as a function of the values of P, E and of the shape parameter c chosen in accordance with a desired motor design, appear to be critical mainly in the regions which have the greatest influence on the shape of the magnetic field, namely in the vicinity of the movable permanent magnet. It has been found that the maximum acceptable error for Y is $+/-0.05$ P, at least in the range $E/2 \leq Y \leq (E/2+0.4)$.

In FIG. 2, the line $Y=0$ represents the plane of symmetry of a disk-shaped permanent magnet according to FIG. 1, having a thickness L.

Y is indicated in mm, the pitch P can, for example, be equal to 3.14 mm for a radius of 25 mm, and the parameter $c_0=c_0(E,P)=1.38$.

In the case of a motor with asymmetric air-gap, the line $Y=0$ of FIG. 2 represents the contact surface between the permanent magnet, the thickness of which is L/2, and the yoke part, so that the minimum air-gap height has the value E/2.

FIGS. 3 to 5 on the one hand, and FIG. 6 on the other hand, show two practical embodiments of polar parts for a motor according to the invention.

More particularly, FIGS. 3 and 4 show the developed profile of a polar part at, respectively, two different distances from the axis of the motor. FIG. 3 corresponds to a radius of 34 mm, and FIG. 4 to a radius of 25 mm. For a motor having 50 pole pairs, i.e. an alternating arrangement of 50 poles of each polarity, the pitch corresponding to each of these radii is $P_1=4.27$ mm and $P_2=3.14$ mm, respectively. Lines 31 and 41 represent the ideal shape of the profile of the polar parts in accordance with FIG. 2, the permanent magnet member being represented by the part referenced 30. A polar part is formed by stacks of sheet parts 32 of silicon iron in which the individual sheets are cut so as to follow the ideal shape of the profile in step-like approximation, in the direction of movement of the permanent magnet. The approximation must be within the limits mentioned above and is thus very good in the vicinity of the crests of the polar parts. The required error limitation, however, allows the sheet parts to be assembled in discrete stacks of limited thickness, which stacks can be inserted or imbedded in a support part of a plastic material or, preferably, of a material having good magnetic permeability.

The shape of the various sheet parts 33 to 37 of a stack 32 is shown in a lateral view in FIG. 5. Two stacks, such as 32, arranged opposite each other in the axial direction, have a contact surface 38 to form a magnetic joint of a generally C-shaped magnetic circuit. The two legs of the C-shaped circuit define an air-gap of the shape shown in FIGS. 3 to 5, so as to take into account the dependency of the pitch on the considered radius. Accordingly, since $P_1$ (FIG. 3) corresponds to the greatest radius $R_1$, and $P_2$ (FIG. 4) corresponds to the smallest radius $R_2$, in each step the sheets adjacent the central sheet have a slanted edge forming the air-gap, as shown in FIG. 5 for the sheets 34, 35 and 36. It will be noted that the slope of the sheet edges is from the outer diameter towards the inner diameter of the magnetized disk 30.

FIG. 6 shows another embodiment in a view similar to that of FIG. 3 or 4, according to which the stacks of sheet parts 62 are machined so as to follow very closely the theoretical profile 63 in the vicinity of the crests of the profile. The stacks are, for example, embedded in a synthetic material as represented by reference numeral 64.

I claim:

1. In an electric synchronous motor of the type comprising a movable permanent magnet member and a stator, wherein the stator comprises a magnetic circuit or an assembly of magnetic circuits coupled with at least one electric control coil, and wherein said movable member comprises a multipolar permanent magnet having two planar surfaces arranged parallel to the direction of movement of said movable member and spaced from each other by a distance substantially smaller than the dimensions of said permanent magnet in said planar surfaces, said permanent magnet having a practically linear de-magnetization characteristic in its working range and being magnetized perpendicularly to said planar surfaces so as to exhibit on each of these surfaces, in the direction of movement of said movable member, at least one series of magnetic poles of same polarity, the centers of which are spaced by P along their path of movement, said magnetic circuit comprising polar parts facing each other and forming an air-gap in which said multipolar permanent magnet is arranged, said air-gap being symmetrical with respect to the middle-plane of the said two planar surfaces of the permanent magnet and having a variable height along the paths of movement X of a point of said middle-plane, said variable height having a value of 2 Y and being measured perpendicularly to said middle-plane, said variable height having a series of minima E, the improvement according to which said polar parts have a shape such that the theoretical value of Y is the solution of the equation $$LN\left[\frac{ch\,(2\pi Y/P + c) - \cos(2\pi X/P)}{ch\,(2\pi Y/P - c) - \cos(2\pi X/P)}\right] - 2\,LN\left[\frac{sh\,(c/2 + \pi E/2P)}{sh\,(c/2 - \pi E/2P)}\right] = 0$$

wherein c is a shape parameter, the maximum error of the actual value of Y with respect to said theoretical value being $+/-0.05$ P, at least within the range $E/2 \leq Y \leq (E/2 + 0.4\,P)$.

2. In an electric synchronous motor of the type comprising a movable permanent magnet member and a stator, wherein the stator comprises a magnetic circuit or an assembly of magnetic circuits coupled with at least one electric control coil, and wherein said movable member comprises a multipolar permanent magnet having two planar surfaces arranged parallel to the direction of movement of said movable member and spaced from each other by a distance substantially smaller than the dimensions of said permanent magnet in said planar surfaces, said movable member further comprising a yoke part of magnetically permeable material arranged in contact with one of said planar surfaces of the permanent magnet, said permanent magnet having a practically linear de-magnetization characteristic in its working range and being magnetized perpendicularly to said planar surfaces so as to exhibit on each of these surfaces, in the direction of movement of said movable member, at least one series of magnetic poles of same polarity, the centers of which are spaced by P along their path of movement, said magnetic circuit comprising a polar part forming with said yoke part an air-gap having a variable height along the path of movement X of a point of said permanent magnet, said variable height having a value of Y and being measured perpendicularly to said planar surfaces of said magnet between the surface of said polar part and the surface of contact between said permanent magnet and said yoke part, said variable height having a series of minima E/2, the improvement according to which said polar part has a shape such that the theoretical value of Y is the solution of the equation of $$LN\left[\frac{ch\,(2\pi Y/P + c) - \cos(2\pi X/P)}{ch\,(2\pi Y/P - c) - \cos(2\pi X/P)}\right] - 2\,LN\left[\frac{sh\,(c/2 + \pi E/2P)}{sh\,(c/2 - \pi E/2P)}\right] = 0$$

wherein c is a shape parameter, the maximum error of the actual value of Y with respect to said theoretical value being $+/-0.05$ P, at least within the range $E/2 \leq Y \leq (E/2 + 0.4\,P)$.

3. In a motor according to one of claims 1 or 2, the improvement according to which said polar part or polar parts are made by pressing or are made by machining of an assembly of sheet material.

4. In a motor according to one of claims 1 or 2, the improvement according to which said polar part or polar parts comprise an assembly of planar sheet parts arranged perpendicularly to the direction of movement of said movable member, said sheet parts being cut so as to form, in said assembly, a step-like approximation of said theoretical value of the variable height of each polar part.

* * * * *